(12) United States Patent
Zhou et al.

(10) Patent No.: US 7,512,216 B2
(45) Date of Patent: Mar. 31, 2009

(54) JOINT FAULT DETECTION

(75) Inventors: Ping Zhou, Ipswich (GB); Andrew D Chattell, Ipswich (GB)

(73) Assignee: British Telecommunications PLC, London (GB)

( * ) Notice: Subject to any disclaimer, the term of this patent is extended or adjusted under 35 U.S.C. 154(b) by 44 days.

(21) Appl. No.: 10/593,307

(22) PCT Filed: Mar. 9, 2005

(86) PCT No.: PCT/GB2005/000900

§ 371 (c)(1),
(2), (4) Date: Sep. 18, 2006

(87) PCT Pub. No.: WO2005/096606

PCT Pub. Date: Oct. 13, 2005

(65) Prior Publication Data

US 2007/0210809 A1    Sep. 13, 2007

(30) Foreign Application Priority Data

Mar. 30, 2004   (GB)   ................... 0407198.1

(51) Int. Cl.
H04M 1/24 (2006.01)
H04M 3/08 (2006.01)
H04M 3/22 (2006.01)

(52) U.S. Cl. .................. 379/22.03; 379/12; 379/14.01; 379/15.05; 379/24; 379/29.03

(58) Field of Classification Search ............... 379/1.01, 379/2, 9, 9.02, 9.04, 9.06, 14.01, 10.01, 12, 379/15.01, 15.05, 22.01, 22.03, 22.05, 22.06, 379/24, 26.01, 27.01, 29.01, 29.02, 29.04, 379/29.1, 30, 29.03

See application file for complete search history.

(56) References Cited

U.S. PATENT DOCUMENTS 3,344,348 A * 9/1967 McNair, Jr. et al. ........... 324/66
4,186,282 A   1/1980 Ellson (Continued)

FOREIGN PATENT DOCUMENTS

JP   52-47369   4/1977

(Continued)

OTHER PUBLICATIONS

International Search Report dated Jun. 7, 2005.
Frantz et al., "Sealing Current and its Impact on ISDN Powering Requirements", Unknown, Oct. 30, 1988, pp. 151-156, XP010078350.

(Continued)

*Primary Examiner*—Binh K Tieu
(74) *Attorney, Agent, or Firm*—Nixon & Vanderhye PC

(57) ABSTRACT

A method and apparatus for detecting a fault in a joint connecting sections of an electrical transmission line together are disclosed. Previously known methods for detecting joint faults require a visual inspection of the joint or testing the transmission line using sophisticated, expensive equipment. This manual testing is expensive and inefficient. In the proposed method, a fault in a joint (301) connecting sections of an electrical transmission line (107) together is detected by measuring the resistance to current flowing through the joint (301) in one and the other directions along said electrical transmission line (107) and detecting a fault in the joint (301) if the measured resistance differs substantially in said one and the other directions. The method has particular utility in relation to low power transmission lines such as telephone lines.

22 Claims, 8 Drawing Sheets

U.S. PATENT DOCUMENTS

| | | | | |
|---|---|---|---|---|
| 4,480,251 | A * | 10/1984 | McNaughton et al. | 340/604 |
| 5,116,535 | A | 5/1992 | Cochrane | |
| 5,246,624 | A | 9/1993 | Miller et al. | |
| 5,661,776 | A * | 8/1997 | Charland | 379/2 |
| 5,708,364 | A * | 1/1998 | Vokey et al. | 324/523 |
| 6,248,144 | B1 | 6/2001 | Tamai et al. | |
| 6,275,050 | B1 | 8/2001 | Born et al. | |
| 6,340,374 | B1 | 1/2002 | Kato et al. | |
| 6,385,297 | B2 * | 5/2002 | Faulkner et al. | 379/1.04 |
| 6,741,676 | B2 * | 5/2004 | Rudinsky et al. | 379/27.04 |
| 7,230,970 | B1 * | 6/2007 | Bryant | 375/130 |
| 7,346,149 | B1 * | 3/2008 | Bryant | 379/27.01 |
| 2007/0230667 | A1 * | 10/2007 | Warner et al. | 379/27.01 |

FOREIGN PATENT DOCUMENTS

| | | |
|---|---|---|
| JP | 03-050112 | 3/1991 |
| JP | 03-060420 | 3/1991 |
| JP | 2000-345144 | 12/2000 |
| JP | 2001-026771 | 1/2001 |
| JP | 2003-268353 | 9/2003 |
| JP | 2003-268354 | 9/2003 |

OTHER PUBLICATIONS

Weinstein, "Passive Intermodulation Distortion in Connectors, Cable and Cable Assemblies", Feb. 1, 2001, XP002330778, Retrieved from the Internet: URL:http://www.amphenolrf.com/simple/PIM%2OPaper.pdf>.

International Search Report dated May 6, 2005.

* cited by examiner

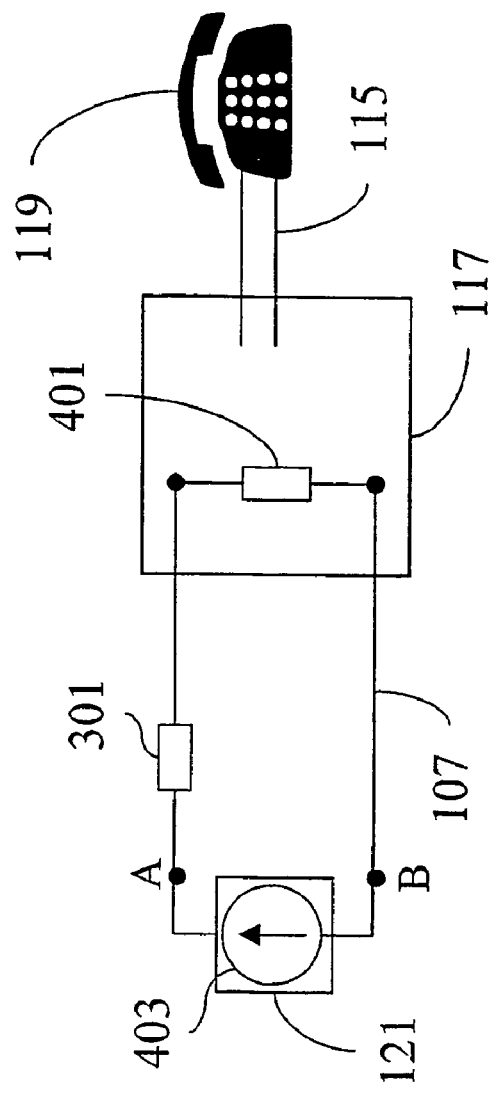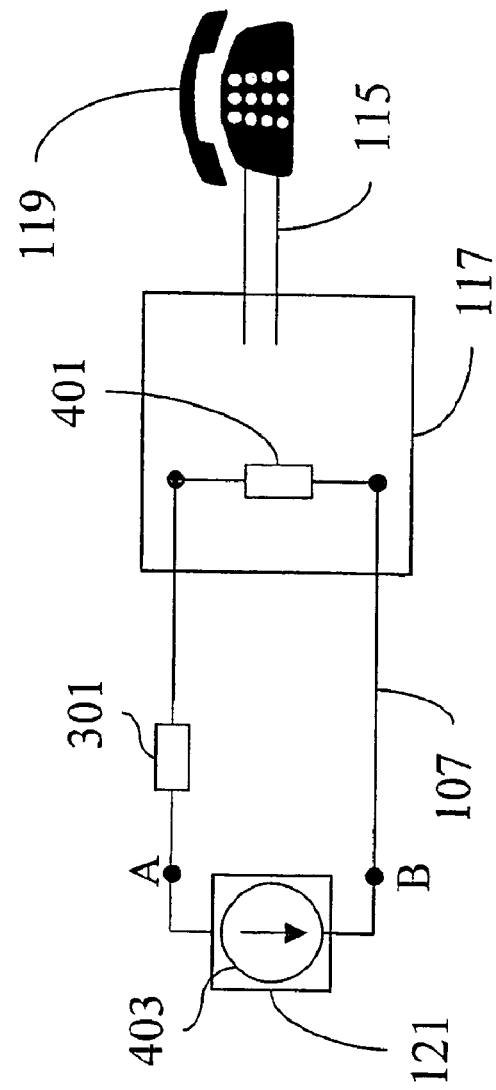

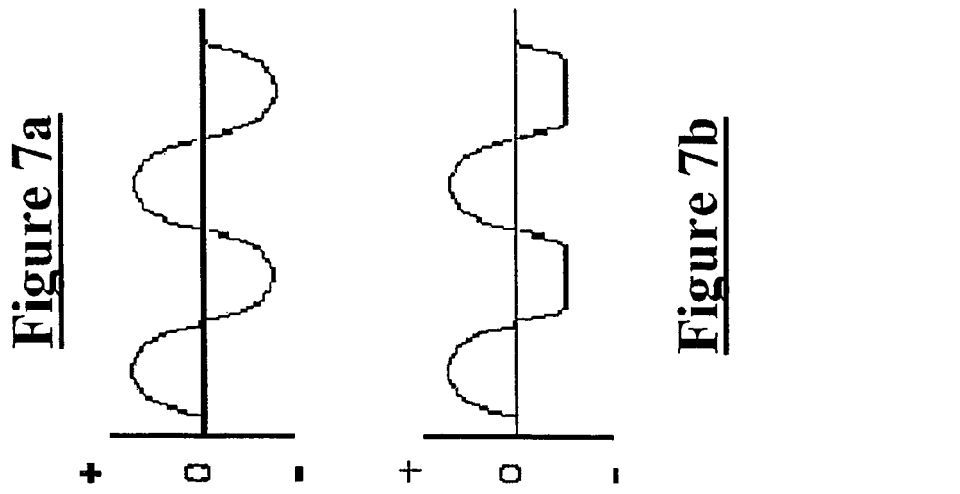
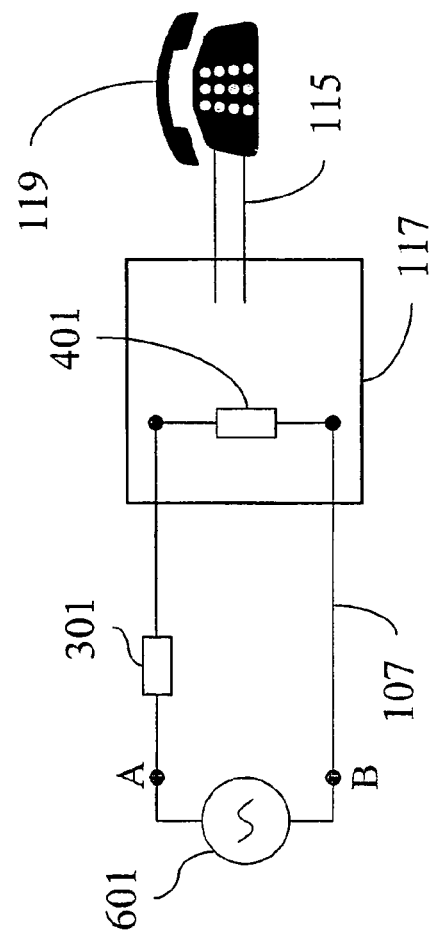
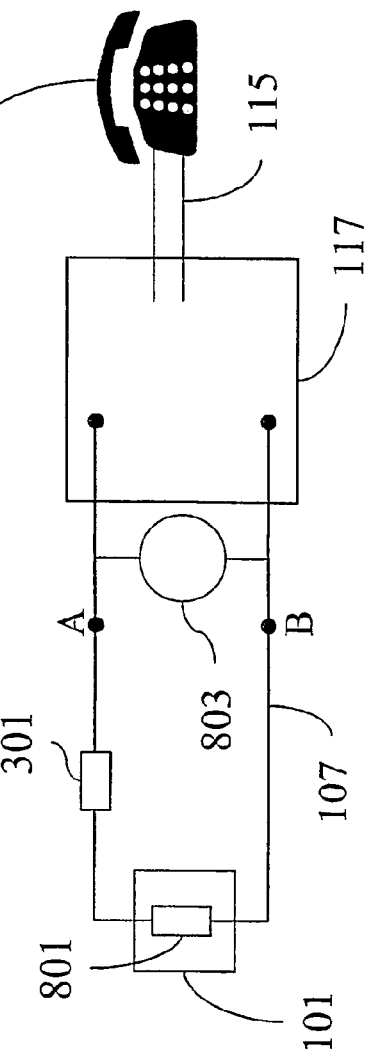

JOINT FAULT DETECTION

This application is the US national phase of international application PCT/GB2005/000900 filed 9 Mar. 2005 which designated the U.S. and claims benefit of GB 0407198.1, dated 30 Mar. 2004, the entire content of which is hereby incorporated by reference.

FIELD OF TECHNOLOGY

This invention relates to a method and apparatus for detecting a fault in a joint connecting sections of an electrical transmission line together. It has particular utility in relation to low-power transmission lines such as telephone lines.

BACKGROUND

The "access network" is that part of a telecommunications network between customers' premises and a local exchange (end office in the United States). Pairs of copper or aluminium wires provide the signal transmission links used in connecting the local exchange to the customer's premises. The pairs of wires are twisted and often buried underground. Usually, several twisted pairs leave the local exchange bundled together in cables that run to customers' premises in the geographic area served by the local exchange. Each twisted pair is usually split into a plurality of sections, with sections being connected together by a joint. After sometime, the condition of the joint can deteriorate (e.g. by corrosion) which leads to a deterioration in the quality of the telephony service provided to the customer but often does not lead to a total loss of service. For voice communications, the customer experiences this deterioration in the form of a noisy, crackling or faint line. For data communications, the customer experiences this deterioration in the form of dropped connections and reduced data transfer rates.

Existing techniques of fault finding in a telecommunications network, such as those disclosed in U.S. Pat. Nos. 4,139,745 and 4,113,998, cannot detect these types of joint faults and when used to test a customer's telephone line report that the line is fault free even when such joint faults are present. In certain circumstances, the current flowing in the telephone lines (sometimes called a 'wetting current') can 'blow away' some of the corrosion in a corroded joint (this is sometimes known as the current having a "sealing effect) and thus can even improve the quality of the line. However, this is not a satisfactory solution since it will not permanently correct the fault. Moreover, faults in joints that are not caused by joint corrosion will remain undetected.

As mentioned above, a customer complaint about the quality of their telephone line (which, unbeknownst to them or the telephone company is owing to a joint fault) will pass a conventional line test. Until the advent of the present invention, an engineer had to be dispatched in order to either visually inspect joints for signs of deterioration or to test the telephone line between the exchange and the customer's premises using sophisticated, expensive testing equipment. This manual testing is both expensive (since an engineer has to be dispatched leading to increased manpower costs) and also inefficient.

SUMMARY

According to a first aspect of the present invention there is provided a method of detecting a fault in a joint connecting sections of an electrical transmission line together, said method comprising: measuring the resistance to current flowing through said joint in one and the other directions along said electrical transmission line and detecting a fault in said joint if the measured resistance differs substantially in said one and the other directions.

The inventors found that a deteriorating joint has an effect on the loop resistance of a telephone line that causes the resistance of the line, when current flows in the line in one direction, to differ from the resistance of the line when current flows in the other direction. Hence by detecting dependence of resistance to current flowing through a joint upon the direction of the current flow, a fault in the joint can be detected more reliably, efficiently and economically than has hitherto been the case.

Preferably the method further comprises applying the current to the electrical transmission line. Thus joint faults can be detected in transmission lines which are not constantly connected to a current supply.

In preferred embodiments, the electrical transmission line comprises a pair of electrical conductors extending between a telephone exchange and a customer's premises and the method further comprises connecting the electrical conductors together by applying a resistive load between the conductors, applying the current at the telephone exchange and remotely controlling a termination device to apply the resistive load between the conductors. Preferably the remote controlled termination device is situated in the customer's premises. Thus a fault in a joint connecting sections of a transmission line in a telecommunications network can be detected without the need to: a) dispatch an engineer to visually inspect one or more joints in the line; b) test the line with sophisticated test equipment; and c) install additional equipment in the customer's premises at the time of testing the line.

In an alternative embodiment, the method comprises applying the resistive load at the telephone exchange and applying the current at a point between the telephone exchange and the customer's premises. Thus a transmission line can be tested section by section for the presence of joint faults.

Preferably, the method comprises one of a sequence of tests carried out in order to test an electrical transmission line. Thus the method can improve the efficiency of previous testing methods in diagnosing faults.

Preferably, the sequence of tests is arranged such that the test to detect a fault in a joint is carried out after a) a test to check for connectivity between end points of said electrical transmission line indicates that said connectivity exists; and b) a test to check whether said electrical transmission line is in contact with earth and/or another electrical transmission line indicates that no such contact exists. Thus joint faults that would otherwise go undetected can be detected.

Preferably, the end points are a telephone exchange and a customer's premises. Thus faults in a telecommunications network that would otherwise go undetected but which lead to a deterioration in the quality of the telephony service provided to a customer can be detected.

According to a second aspect of the present invention there is provided apparatus for detecting a fault in a joint connecting sections of an electrical transmission line together, said apparatus comprising means for measuring the resistance to current flowing through said joint in one and the other directions along said electrical transmission line; and means for detecting a fault in said joint if the measured resistance differs substantially in said one and the other directions.

According to a third aspect of the present invention there is provided apparatus for detecting a fault in a joint connecting sections of an electrical transmission line together, said apparatus comprising a measurer operable to measure the resistance to current flowing through said joint in one and the other directions along said electrical transmission line; and a detector operable to detect a fault in said joint if the measured resistance differs substantially in said one and the other directions.

BRIEF DESCRIPTION OF DRAWINGS

Embodiments of the present invention will now be described, by way of example only, with reference to the accompanying drawings, wherein like reference numbers refer to like parts, and in which:

FIGS. 4a-4b show a first embodiment of a loop line test;

FIG. 6 shows a second embodiment of a loop line test;

FIGS. 7a-7b show examples of the test results obtained by the loop line test of FIG. 6;

FIG. 8 shows a third embodiment of a loop line test;

DETAILED DESCRIPTION

Figure 1:
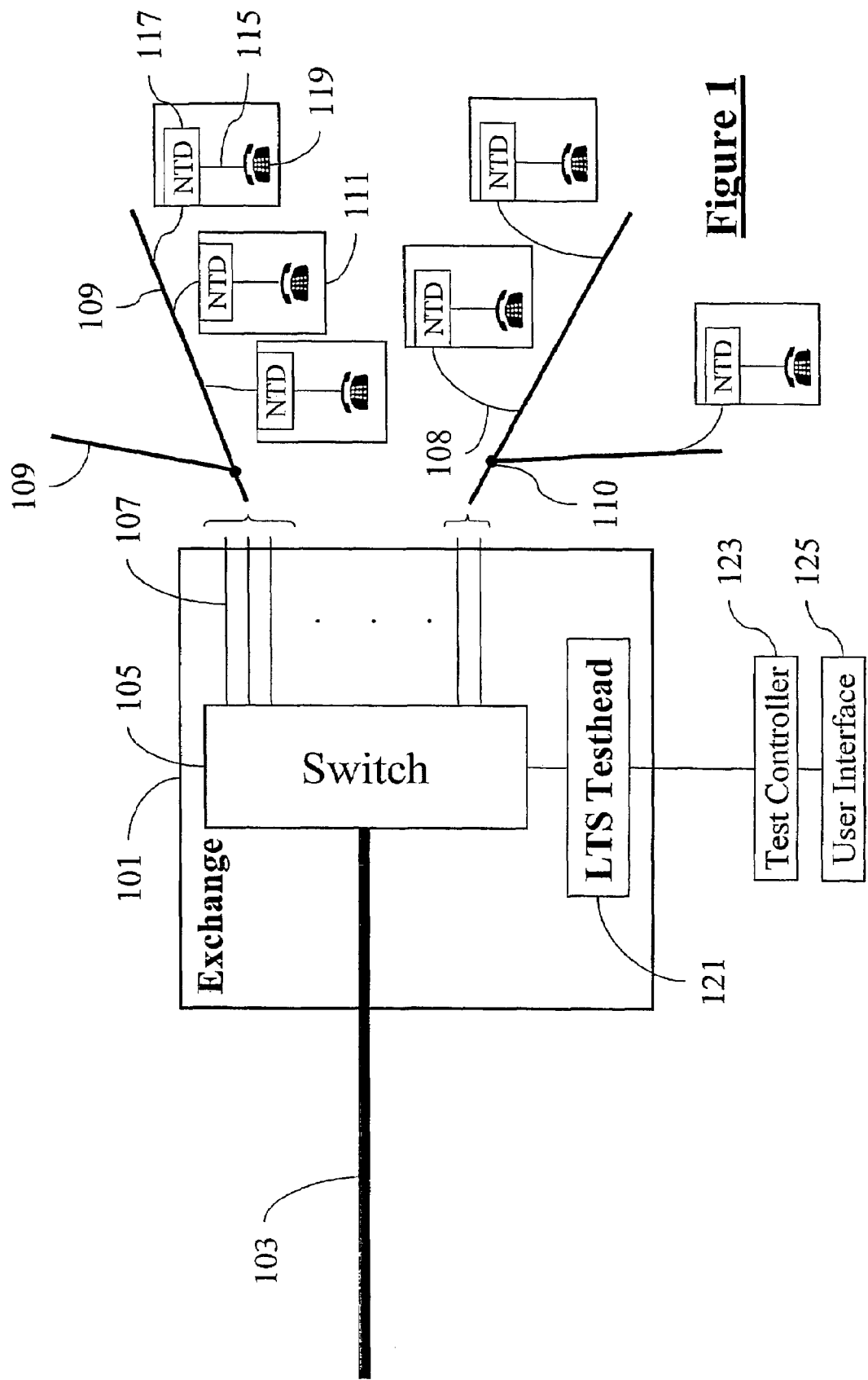
FIG. 1 is a schematic illustration of a telephone network.

With reference the FIG. 1, exchange 101 receives a trunk line 103 which connects exchange 101 to other exchanges in the telecommunications network. Trunk line 103 carries signals multiplexing many telephone calls and other communications made using the network.

Inside exchange 101, trunk line 103 connects to switch 105. To establish a connection for a telephone call, switch 105 connects trunk line 103 to a customer line 107. Each customer line 107 comprises a twisted pair of copper wires.

Inside exchange 101, many customer lines 107 are grouped together and leave the exchange bundled in cables 109 that are often buried underground. Cables 109 run near customer premises 111 throughout the geographic area served by the exchange 101. Each customer premises 111 is connected to a cable through a drop wire 108, which carries customer line 107 to the customer premises 111 either aerially or buried underground. Usually, cables 109 are split into a plurality of sections with sections being connected together by a joint 110, also called a distribution point or a cross connect point. At the joint 110, a cable 109 can be divided into two or more cables in order to serve different sub-areas within the geographic area served by exchange 101.

Inside customer premises 111, telephone signals are carried on customer wiring 115. At the entry to customer premises 111, the customer line 107 connects to a network terminating device (NTD) 117 which is the demarcation point between the access network (i.e. cables 109 including customer lines 107) and the customer wiring 115. A suitable NTD is the NT Elite available from Spescom Limited UK, Spescom House, 53/55 Uxbridge Road, Ealing, London, W5 5SA, United Kingdom. Further functional details of NTD 117 will be given below. NTD 117 is connected to customer premises equipment (CPE) 119, which is shown as comprising a telephone although it may alternatively comprise a facsimile machine or a modem, for example.

Exchange 101 includes a line test system (LTS) testhead 121 connected to switch 105. LTS Testhead 121 could be part of a commercially available line test system, such as one available from Teradyne Inc., Broadband Test Division, 1405 Lake Cook Rd, Deerfield, Ill. 60015, USA. LTS Testhead 121 can be operated to perform various line tests on one or more customer lines 107 in order to detect and locate any faults on the customer line 107 under test. During a line test, switch 105 connects LTS Testhead 121 to the customer line 107 under test. LTS Testhead 121 is operable to generate or receive various test signals and measure various electrical properties including voltage, current, resistance, capacitance, inductance, charge stored on the line and impedance. A more detailed description of the line tests will be given below.

LTS Testhead 121 is controlled by a Test Controller 123 usually located remote to LTS Testhead 121. Test controller 123 is operable to control LTS Testhead 121 to perform line tests on customer line 107. Those skilled in the art will realise that Test Controller 123 can be operated to control additional LTS Testheads not shown in FIG. 1. Test Controller 123 also interprets the results of these line tests.

Test controller 123 is connected to a user interface 125 that is operable to output data to a user and accept data input by a user. From user interface 125, a user can select a customer line 107 to be tested, select the line tests to be performed on that customer line 107 and view the results of the selected line tests.

Figure 2A:
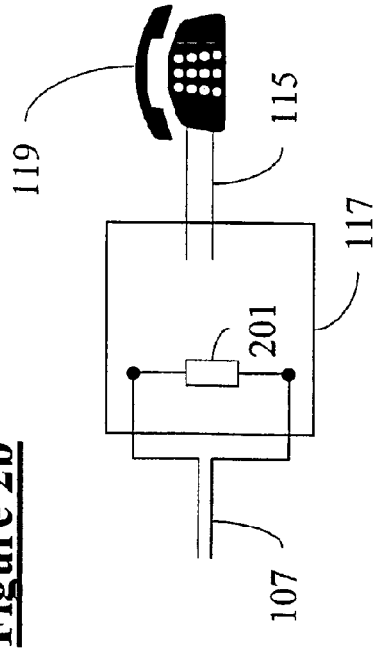
FIGS. 2a-2c show different operating modes of a network terminating device in the network of FIG. 1.
Figure 2B:
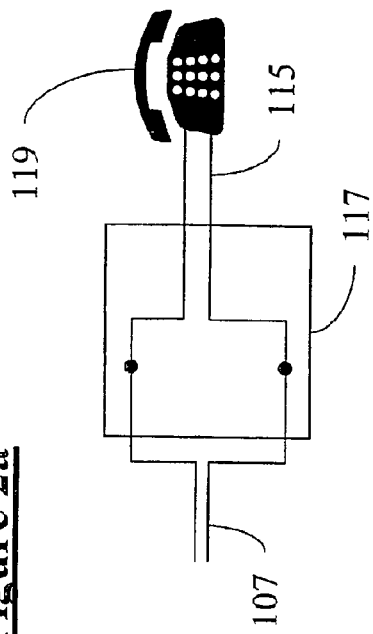
Figure 2C:
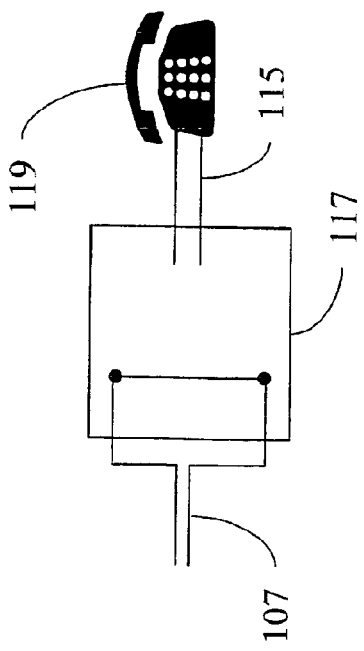

The functionality of NTD 117 will be described in more detail with reference to FIG. 2. NTD 117 operates in two different modes. In a passive (PASS) mode, NTD 117 connects customer wire 107 to customer wiring 115 as illustrated schematically in FIG. 2a. NTD 117 operates in PASS mode when there is no line test being performed on the customer line and during a passive line test. In the simplest example of such a line test, a binary indication of whether or not there is a fault on the customer line 107 according to the passive line test can be obtained. An indication of 'disconnection faults' (where there is no connectivity between end points of a customer line 107) and 'contact faults' (where a customer line 107 is in contact with earth and/or another customer line) can also be obtained. The Teradyne line test system mentioned above is operable to perform such passive line tests and to interpret some of the test results. Those skilled in the art will already be aware of such line tests. Hence, they will not be described in any further detail.

NTD 117 can also operate in a loop (LOOP) mode, wherein NTD 117 is operable to isolate CPE 119 and customer wiring 115 from the network wiring. In LOOP mode, NTD 117 terminates the network wiring either in a closed circuit using a resistive load 201, as illustrated schematically in FIG. 2b, or in a short circuit, as illustrated schematically in FIG. 2c. NTD 117 operates in LOOP mode during a loop line test, which will be described in more detail below.

A more detailed description of the various line tests that can be carried out by LTS Testhead 121 will now be given.

Figure 3:
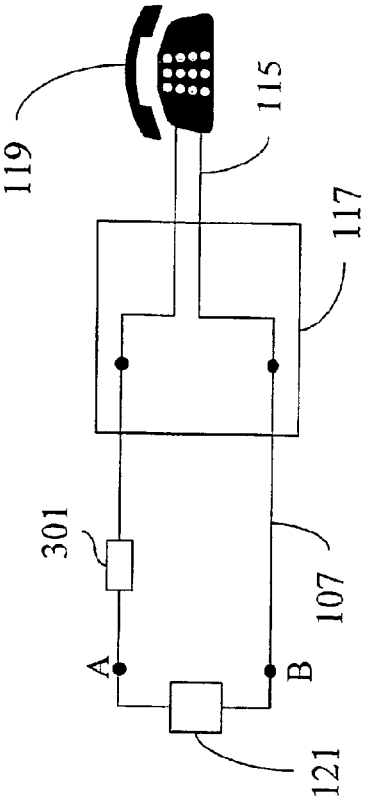
FIG. 3 shows a circuit model of one customer line in the network of FIG. 1.

As has already been mentioned, each customer line 107 is usually split into a plurality of sections, with sections being connected together by a joint. After sometime, the condition of the joint can deteriorate (e.g. by corrosion). The inventors have found that joint deterioration causes the customer line 107 to exhibit 'non-Ohmic' behaviour, i.e. its current-voltage (I-V) characteristic does not conform to Ohm's Law (where current and voltage have a linear relationship). Thus, they found that a deteriorating joint can be modelled as a non-Ohmic resistance. With reference to FIG. 3, CPE 119 is connected to NTD 117 via customer wiring 115. NTD 117 connects customer wiring 115 to customer line 107 which is connected to LTS Testhead 121. Corrosion at a joint, which joins two sections of a customer line 107 together, is modelled as non-ohmic resistor 301. Non-ohmic resistor 301 causes the resistance $R_{AB}$ when current flows in one direction to differ from the resistance $R_{BA}$ when current flows in the other direction. In the absence of joint deterioration, these two resistance values would be approximately the same. Hence joint deterioration can be detected by detecting a change in resistance of customer line 107 dependent upon the direction of current flow around the circuit. This is achieved by performing a loop line test. Owing to the effect joint deterioration has on the loop resistance, faults caused by joint deterioration are called unbalanced loop resistance (ULR) faults.

In a first embodiment of the loop line test, as shown in FIGS. 4a and 4b, NTD 117 operates in LOOP mode as described above, isolating CPE 119 and customer wiring 115 from the network wiring and terminating the customer line 107 in a resistive load 401. A DC power source 403, applied by LTS Testhead 121 as shown in FIG. 4a, drives a direct current around the loop. LTS Testhead measures the resistance $R_{AB}$ around the loop. LTS Testhead 121 then reverses the polarity of the DC power source, as shown in FIG. 4b, and measures the resistance $R_{BA}$ around the loop. Suitable values for the resistive load 401 and DC power source 403 are 600Ω and 50V respectively. However, the resistive load 401 could also be less than 600Ω, preferably even as small as 0Ω (short circuit) to 10Ω.

Figure 5:
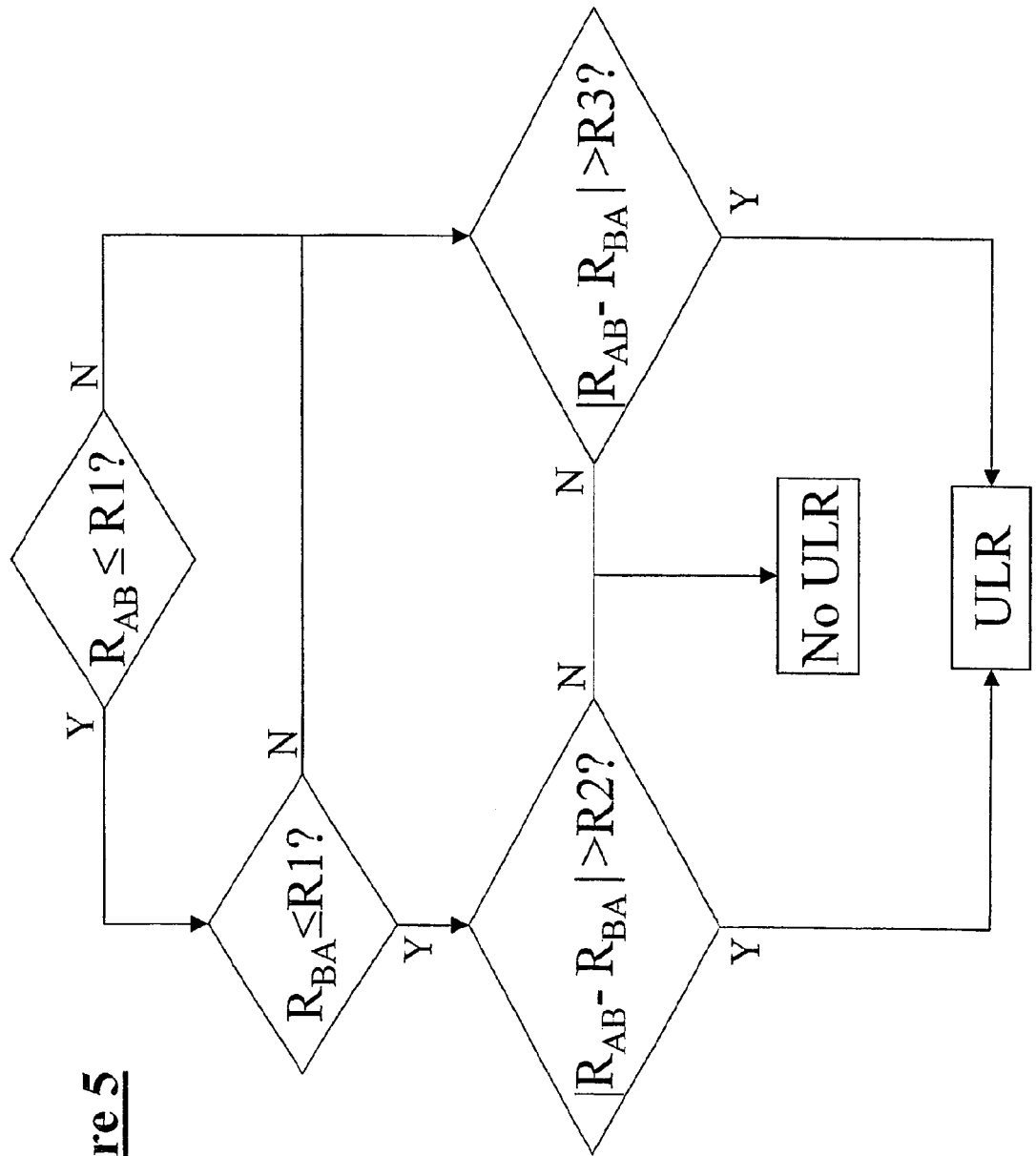
FIG. 5 is a flow chart showing the interpretation applied to the results of the loop line test of FIGS. 4a & 4b.

In order to determine whether there is a corroded joint and hence a ULR fault Test Controller 123 interprets the two resistance measurements according to the following rules (FIG. 5):

1. If $R_{AB} \leq R1$ and $R_{BA} \leq R1$
   and $|R_{AB}-R_{BA}| > R2$ then a ULR exists.
2. If $R_{AB} > R1$ or $R_{BA} > R1$
   and $|R_{AB}-R_{BA}| > R3$ then a ULR exists
3. In all other cases, no ULR exists.

where R1, R2 and R3 are threshold values. Examples of suitable threshold values are 892Ω, 5Ω and 10Ω respectively. If a perfectly accurate testing apparatus were achievable, it would be possible to use the single rule: "If $|R_{AB}-R_{BA}| > 5\Omega$ then a ULR exists". In practice, however, testing apparatus is only accurate to different degrees for different ranges of measurements. Consequently, R1 and R3 have to be introduced to account for the inaccuracy of the apparatus. R1=892Ω and R3=10Ω are used in this example because the Teradyne line test system, of which LTS Testhead 121 can form a part, is accurate to 1Ω for 0<R1≦892Ω and accurate to 10Ω for R1>892Ω. Those skilled in the art will realise, therefore, that R and R3 can vary from these values depending on the accuracy of the line test system apparatus.

In an alternative embodiment of the loop line test, as shown in FIG. 6, the DC power source 403 used in the first embodiment is replaced by an AC power source 601 producing a sinusoidal AC voltage as shown in FIG. 7a. A suitable value for the AC voltage is 50V supplied at a frequency of 8 Hz. As will be clear to a skilled person, the polarity of the voltage from AC power source 601 will periodically change direction and non-Ohmic resistor 301 will have a rectifying effect on the AC waveform, as shown in FIG. 7b. Rectification of the alternating current is therefore indicative of the change in loop resistance around the customer line in dependence upon the direction in which current flows around that loop and hence can be used to detect ULR faults caused by joint corrosion. One way that this can be achieved is to measure the DC component of the AC signal using a digital meter. The meter samples the current voltage waveform as shown in FIG. 7b and if the sampling frequency is at least 4 times higher than the frequency of the sampled signal (i.e. at least 32 Hz in this case), averaging the samples should provide the DC component of the AC signal. This measurement will be more accurate for higher sampling frequencies. If there is no rectification, the measured DC component should be zero or very small. A large rectification results in a larger measured DC component.

Figure 11:
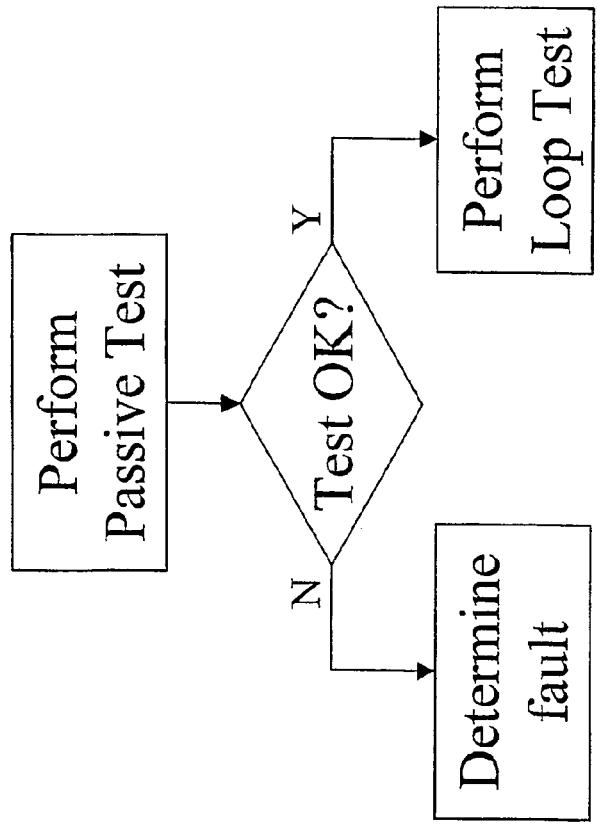
FIG. 11 is a flow chart showing the interpretation applied to the results of the automatic line test of FIG. 10.

Until the advent of the present invention, line test systems have not been able to detect ULR faults and the tests performed have all reported that the line having only a ULR fault is fault free. In a preferred embodiment of the invention, an automatic line test is selected by a user of user interface 125. With reference to FIG. 11, the automatic line test consists of first performing a passive test, like the one described above, which can give a binary indication of whether or not there is, for example, a disconnection or contact fault on the customer line. If this passive test does not report 'Test OK', then further tests are needed to determine the exact nature of the fault. This is not relevant to the present invention and will not be described in any more detail. If, however, the passive test reports 'Test OK' then a loop line test is performed to check for the presence of ULR faults.

Figure 9:
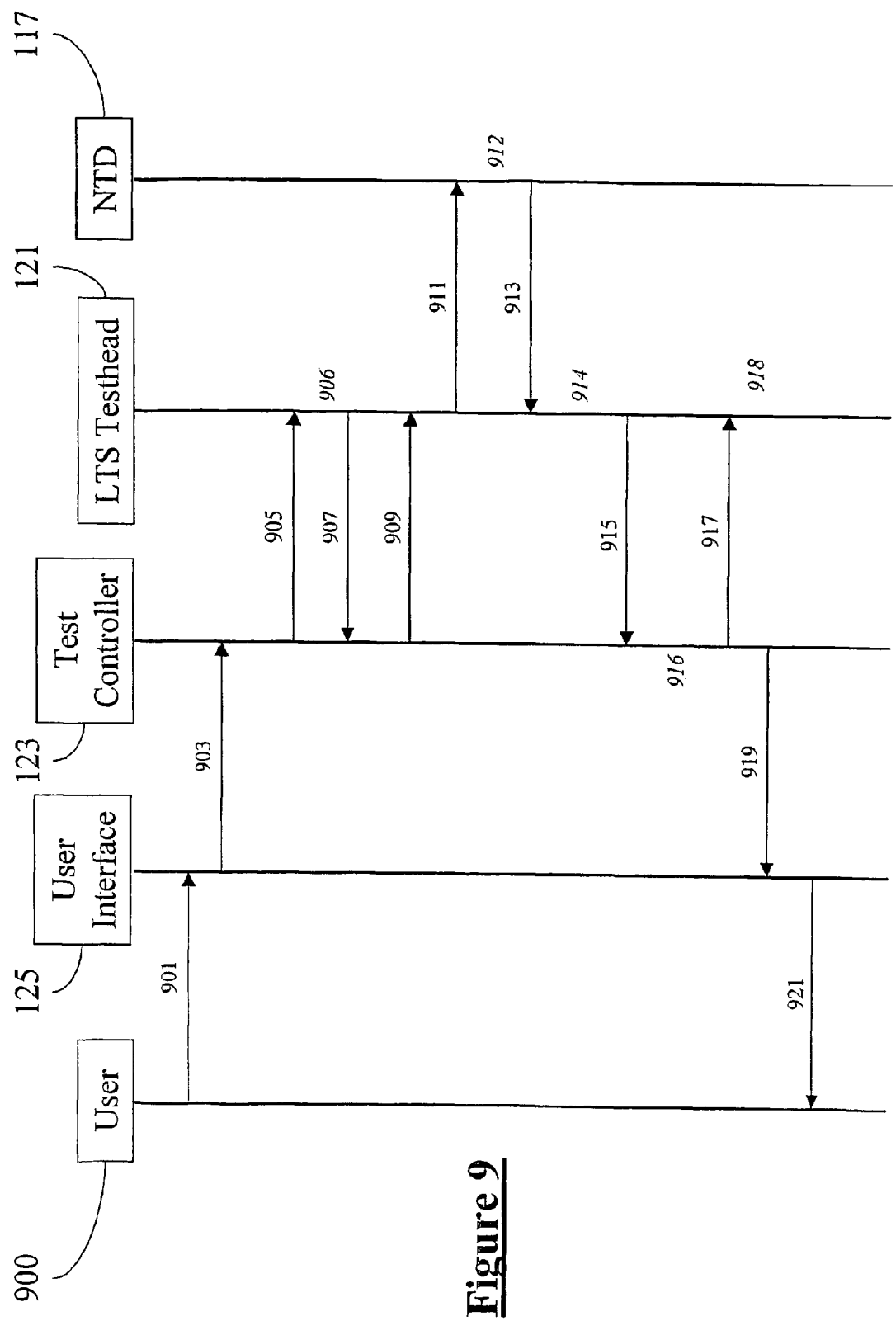
FIG. 9 shows the method of performing a loop line test.

With reference to FIG. 9, the process of testing a line will now be described. In order to carry out a loop line test, a user 900 inputs (step 901), via user interface 125, the customer line 107 that is to be tested and the nature of the line test that is to be carried out; in this case, a loop line test: User interface 125 forms a message containing the user inputted information and forwards the message (step 903) to Test Controller 123 which then sends a message (step 905) to LTS Testhead 121 requesting access to the specified customer line 107 in order to carry out the specified line test. LTS Testhead 121 then accesses (step 906) the specified customer line 107 via switch 105 and sends a message (step 907) to Test Controller 123 informing it that the specified customer line 107 has been accessed. Test Controller 123 then sends a message (step 909) to LTS Testhead 121 requesting that the specified test (in this case a loop line test) be carried out on the specified customer line 107. LTS Testhead 121 then sends a signal (step 911) to the NTD 117 that terminates the specified customer line 107, which signal causes NTD 117 to enter its loop mode of operation (step 912). NTD 117 sends a signal (step 913) to LTS Testhead 121 in order to acknowledge that it has entered loop mode at which time LTS Testhead 121 can take the relevant loop line test measurements (step 914) and send the results (step 915) of the test measurements to Test Controller 123. Test Controller 123 then interprets the test results (step 916) (in this case, according to the rules described above in relation to the loop line test) and also sends a message (step 917) to LTS Testhead 121 informing it that access to the specified customer line 107 can be terminated. LTS Testhead 121, via switch 105, drops access (step 918) to the customer line 107. Having interpreted the test results, Test Controller 123 sends a message (step 919) to User Interface 125 containing the interpreted test results and User Interface 125 displays the test result to the user (step 921) who can then take appropriate action (e.g. do nothing, dispatch an engineer etc.) depending on whether or not there is a ULR fault on the line.

Figure 10:
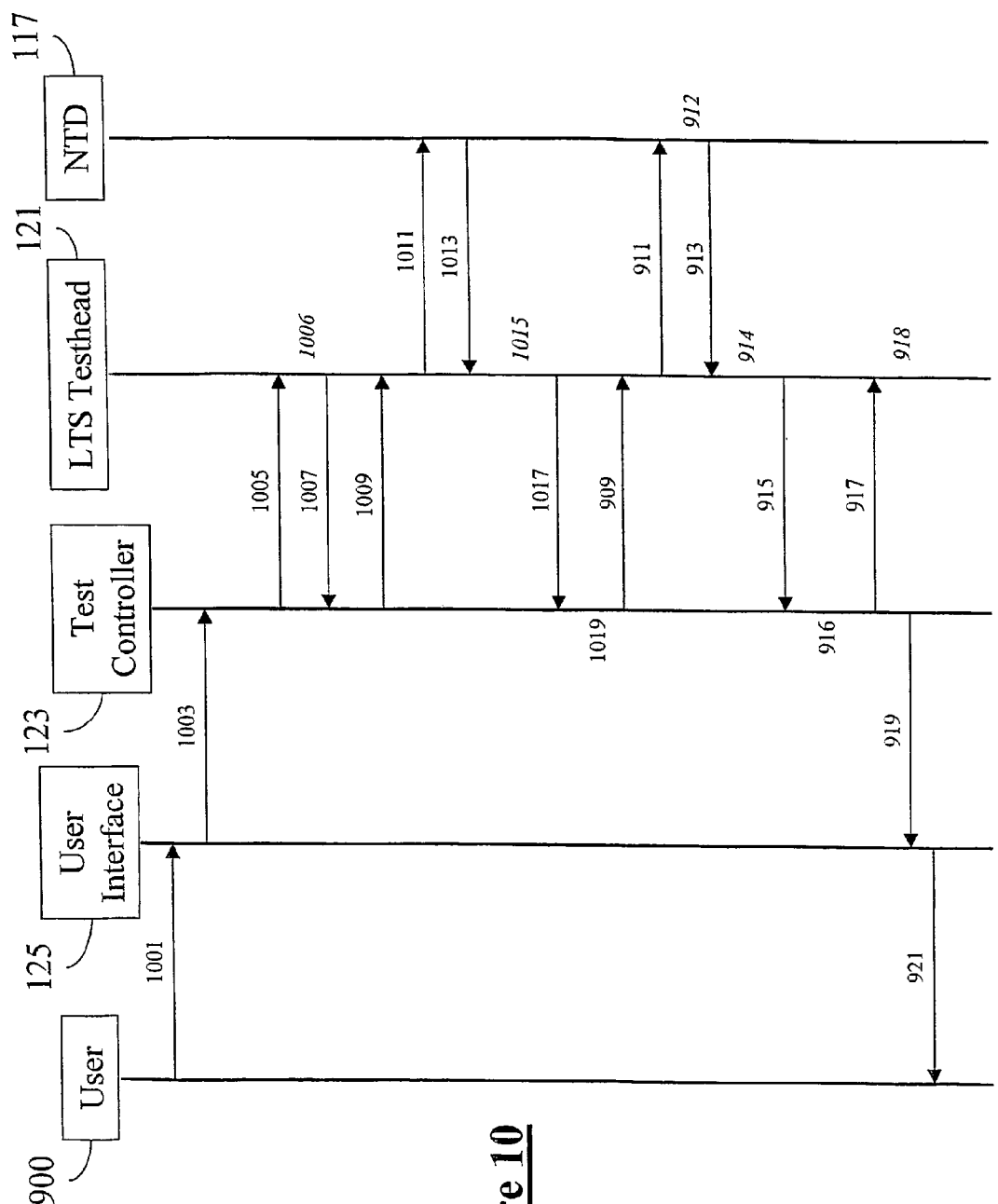
FIG. 10 shows the method of automatically performing a sequence of line tests.

With reference to FIG. 10, the process of automatically performing a sequence of passive and loop line tests (an automatic line test) will now be described. In order to detect ULR faults, a user 900 inputs (step 1001), via user interface 125, the customer line 107 that is to be tested and the nature of the line test that is to be carried out; in this case, an automatic line test. User interface 125 forms a message containing the user inputted information and forwards the message (step 1003) to Test Controller 123 which then sends a message (step 1005) to LTS Testhead 121 requesting access to the specified customer line 107 in order to carry out the specified automatic line test. LTS Testhead 121 then accesses (step 1006) the specified customer line 107 via switch 105 and sends a message (step 1007) to Test Controller 123 informing it that the specified customer line 107 has been accessed. Test Controller 123 then sends a message (step 1009) to LTS Testhead 121 requesting that a passive test be carried out on the specified customer line 107. LTS Testhead 121 then sends a signal (step 1011) to the NTD 117 that terminates the specified customer line 107, which signal causes NTD 117 to remain in its passive mode of operation. NTD 117 sends a signal (step 1013) to LTS Testhead 121 in order to acknowledge that it is ready for the passive test at which time LTS Testhead 121 can perform the passive line test (step 1015) and send the results (step 1017) of the test to Test Controller 123. Test Controller 123 then interprets the test results (step 1019) (in this case, according to the rules described above in relation to the automatic line test) and in the case where the result of the passive test indicates that the line is fault free, Test Controller 123 sends a message (step 909) to LTS Testhead 121 requesting that a loop line test be carried out on the specified customer line 107. The process then continues through steps 911 to 921 as described above in order to determine whether or not a ULR fault exists on the customer line. It is to be understood that some fault is assumed present, since it is this that will have caused the customer to complain.

It will be apparent from the foregoing description that many modifications or variations may be made to the above described embodiments without departing from the invention.

For example, in a further alternative embodiment of the loop line test, as shown in FIG. 8, a resistive load 801 (or alternatively a short circuit) is applied to customer line 107 inside exchange 101 and the customer line 107 is terminated in an open circuit. The application of the resistive load 801 and/or the termination of the customer line 107 can be carried out by an engineer and/or LTS Testhead 121. The termination of a customer line 107 can be carried out by either manually disconnecting CPE 119 or by operating NTE 117 to isolate CPE 119. Portable test equipment 803 is then applied across the customer line 107 by an engineer. Suitable portable test equipment is the CopperMax®/OSP metallic portable test system available from Spirent™ Communications, Hamilton International Technology Park, High Blantyre, Glasgow, G72 0FF, UK. Portable test equipment 803 is operable to carry out passive line tests in addition to the same resistance measurements as described above in relation to the other embodiments of the loop line test. It is also operable to interpret the measurements in order to display to the engineer whether or not a ULR fault is present on the customer line 107 under test. The engineer can apply portable test equipment 803 to the customer line 107 at any point along customer line 107 between customer premises 111 and exchange 101.

Although the above embodiments have been described in relation to a transmission line in a telecommunications network comprising a pair of wires twisted together, the invention is equally applicable to other types of transmission line including, for example, a transmission line supplying power to a sensitive, low power device where the current flowing in the transmission line is sufficiently small (e.g. less than 30 mA). For example, a current of between 4 mA and 20 mA used for industrial sensor current loop signalling.

Figure 12:
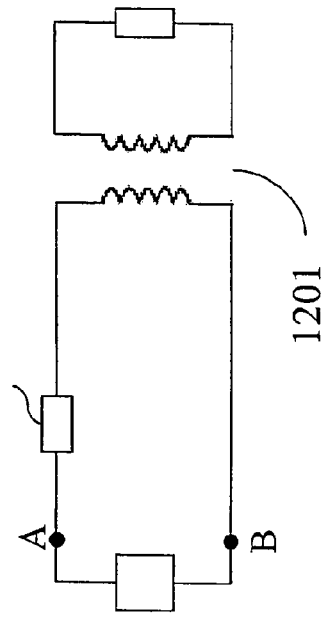
FIG. 12 shows an alternative embodiment of the present invention.

An alternative embodiment is shown in FIG. 12 where a transmission line, in two sections connected by a joint (modelled as non-Ohmic resistor 301), connects to a transformer 1201. In this case, it is not necessary to apply a resistive load or short circuit in order to carry out the loop test.

Although in the above described embodiments a current was applied to the transmission line by LTS Testhead 121, in other embodiments a current may already be flowing in the transmission line and hence applying the current is not necessary.

The invention claimed is:

1. A method of detecting a fault in a joint, connecting sections of an electrical transmission line together, said method comprising:
applying a direct current to said electrical transmission line in one direction;
detecting the condition of said joint by,
measuring the electrical resistance of said transmission line,
reversing the direction of said direct current,
re-measuring the electrical resistance of said line, and
detecting a dependence in electrical resistance of said electrical transmission line upon the direction of flow of said direct current; and
detecting deterioration of said joint by detecting a change in electrical resistance greater than a predetermined threshold.

2. A method according to claim 1, wherein said electrical transmission line comprises a pair of electrical conductors and said method further comprises the antecedent step of connecting said electrical conductors together.

3. A method according to claim 2, further comprising connecting said electrical conductors together by applying a resistive load between said conductors.

4. A method according to claim 3, further comprising remotely controlling a termination device to apply said resistive load between said conductors.

5. A method according to claim 3, wherein said resistive load has a resistance of less than 600Ω.

6. A method according to claim 5, wherein said resistive load has a resistance of 0Ω to 10Ω.

7. A method according to claim 1, wherein said electrical transmission line comprises a transmission line in a telecommunications network.

8. A method according to claim 7, wherein said transmission line extends between a telephone exchange and a customer's premises.

9. A method according to claim 8, further comprising applying said current at said telephone exchange and applying said resistive load at said customer's premises.

10. A method according to claim 9, wherein said termination device is situated in said customer's premises.

11. A method according to claim 9, further comprising applying said resistive load at said telephone exchange and applying said current at a point between said telephone exchange and said customer's premises.

12. A method according to claim 11, further comprising applying electric current at said customer's premises.

13. A method according to claim 1, wherein said predetermined threshold value is between 5Ω and 10Ω.

14. A method of testing an electrical transmission line by carrying out a sequence of tests, wherein one of said tests comprises detecting a fault in a joint connecting sections of said electrical transmission line together according to the method of claim 1.

15. A method according to claim 14, wherein said sequence is arranged such that said test to detect a fault in said joint is carried out after:
  a) a test to check for connectivity between end points of said electrical transmission line indicates that said connectivity exists; and
  b) a test to check whether said electrical transmission line is in contact with earth and/or another electrical transmission line indicates that no such contact exists.

16. A method according to claim 15, wherein said end points are a telephone exchange and a customer's premises.

17. An apparatus for detecting a fault in a joint, connecting sections of an electrical transmission line together, said apparatus comprising:
  means for applying direct current to said electrical transmission line in one direction and a reversed direction;
  means for measuring the electrical resistance of said transmission line in said one and reversed directions;
  means for detecting a dependence in electrical resistance of said electrical transmission line upon the direction of flow of said direct current; and
  means for detecting deterioration of said joint by detecting a change in electrical resistance greater than a predetermined threshold.

18. Apparatus according to claim 17, wherein said electrical transmission line comprises a transmission line in a telecommunications network comprising a pair of electrical conductors.

19. Apparatus according to claim 18, wherein said apparatus further comprises means for controlling a termination device installed between said conductors, said termination device being operable to connect said electrical conductors together with a resistive load.

20. Apparatus according to claim 19, wherein said transmission line extends between a telephone exchange and a customer's premises.

21. Apparatus according to claim 20, wherein said termination device is situated in said customer's premises.

22. An apparatus according to claim 17, wherein said predetermined threshold value is between 5Ω and 10Ω.

* * * * *